United States Patent

Wu et al.

[11] Patent Number: 6,039,872
[45] Date of Patent: *Mar. 21, 2000

[54] HYDROPHILIC MEMBRANE

[75] Inventors: Xiaosong Wu, Pensacola; Joel Shertok, Pace; Peter Konstantin, Gulf Breeze, all of Fla.

[73] Assignee: Pall Corporation, East Hills, N.Y.

[*] Notice: This patent is subject to a terminal disclaimer.

[21] Appl. No.: 09/058,631

[22] Filed: Apr. 10, 1998

Related U.S. Application Data

[63] Continuation-in-part of application No. 08/958,654, Oct. 27, 1997.

[51] Int. Cl.[7] .................................................... B01D 39/00
[52] U.S. Cl. ......................................................... 210/500.35
[58] Field of Search ........................ 210/500.35, 500.41, 210/500.38, 500.27; 264/41

[56] References Cited

U.S. PATENT DOCUMENTS

| | | |
|---|---|---|
| 4,377,481 | 3/1983 | Jakabhazy . |
| 4,412,922 | 11/1983 | Mir . |
| 4,618,533 | 10/1986 | Steuck . |
| 4,702,840 | 10/1987 | Degen et al. . |
| 4,761,233 | 8/1988 | Linder et al. . |
| 4,917,793 | 4/1990 | Pitt et al. . |
| 4,943,374 | 7/1990 | Heininger et al. ...................... 210/651 |
| 4,976,897 | 12/1990 | Callahan et al. . |
| 5,004,543 | 4/1991 | Pluskal et al. . |
| 5,021,160 | 6/1991 | Wolpert . |
| 5,057,218 | 10/1991 | Koshoji et al. . |
| 5,079,272 | 1/1992 | Allegrezza, Jr. et al. .............. 521/134 |
| 5,137,633 | 8/1992 | Wang . |
| 5,151,189 | 9/1992 | Hu et al. . |
| 5,158,721 | 10/1992 | Allegrezza, Jr. et al. . |
| 5,209,849 | 5/1993 | Hu et al. . |
| 5,282,971 | 2/1994 | Degen et al. . |
| 5,401,410 | 3/1995 | Bell et al. . |
| 5,468,390 | 11/1995 | Crivello et al. . |
| 5,531,893 | 7/1996 | Hu et al. . |
| 5,531,900 | 7/1996 | Raghavan et al. . |
| 5,547,575 | 8/1996 | Demmer et al. . |

FOREIGN PATENT DOCUMENTS

| | | |
|---|---|---|
| 0 424 873 | 5/1991 | European Pat. Off. . |
| 0 430 082 | 6/1991 | European Pat. Off. . |
| 97/22406 | 6/1997 | WIPO . |

OTHER PUBLICATIONS

Bergbreiter, *Proc. Am. Chem. Soc.*, 73, 552–553 (1995).
Iwata et al., *Journal of Applied Polymer Science*, 54(1), 125–128 (Oct. 1994).
Yamagishi et al., *Journal of Membrane Science*, 105, 237–247 (1995).

*Primary Examiner*—Ana Fortuna
*Attorney, Agent, or Firm*—Leydig, Voit & Mayer, Ltd.

[57] ABSTRACT

A hydrophilic porous membrane is provided which comprises a network of a non-crystalline hydrophobic polymer and a hydrophilic acrylate polymer. A method of preparing such a hydrophilic porous membrane also is provided, wherein a reaction solution of a non-crystalline hydrophobic polymer, a crosslinkable diacrylate, a polymerization initiator, and, optionally, a hydrophilic monoacrylate, is polymerized and/or crosslinked in situ and cast to provide a hydrophilic porous membrane.

40 Claims, No Drawings

HYDROPHILIC MEMBRANE

CROSS-REFERENCE TO RELATED APPLICATIONS

This patent application is a continuation-in-part of copending U.S. Patent Application Ser. No. 08/958,654, filed Oct. 27, 1997 pending.

TECHNICAL FIELD OF THE INVENTION

The present invention relates to porous hydrophilic membranes and methods of preparing and using such membranes.

BACKGROUND OF THE INVENTION

In many applications of filtration technology, it is highly desirable to utilize a porous membrane which is both hydrophilic and has desirable bulk properties, such as mechanical strength, flexibility, thermal stability, and chemical stability. Since many known polymers having desirable bulk properties are hydrophobic, it has become important to develop membranes which have the desirable bulk properties of hydrophobic polymers, yet have desirable hydrophilic surface properties which differ dramatically from the properties of the hydrophobic support polymer. Desirable surface properties include wettability, low protein adsorption, thromboresistance, controlled ion exchange capacity, and controlled surface chemical reactivity.

One method of preparing hydrophilic membranes involves graft polymerizing a hydrophilic monomer onto the surface of a porous hydrophobic polymeric membrane substrate. However, it is difficult to apply a graft coating to the entire surface of the substrate without clogging the pores thereof. A typical example of a photochemical grafting process used to hydrophilically modify the surface of a hydrophobic polymer is described in U.S. Pat. No. 5,468,390. A method for grafting a non-graftable substrate is described in U.S. Pat. No. 5,547,575. That method involves coating the substrate with an N-containing polymer, halogenating the coating to form an intermediate N-halogenated species, and then grafting the treated substrate with an ethylenically unsaturated hydrophilic monomer. While this approach might be useful, it is expensive, requiring a coating as well as an N-halogenated intermediate, which is eventually displaced upon grafting of the hydrophilic monomer.

Another method that can be used to impart hydrophilic surface properties to a hydrophobic substrate is to coat a preformed hydrophobic membrane with surfactants or water-soluble polymers, such as polyvinyl pyrrolidone. This approach is substantially limited, particularly due to flux reduction caused by reduction of pore size. Flux reduction is especially severe for membranes having small pore dimensions (e.g., <0.1 $\mu$m).

An attempt to address the problem of pore clogging can be found in U.S. Pat. No. 4,976,897 (the '897 patent) which discloses a microporous support coated with a UV curable resin having a sufficiently high viscosity to allegedly prevent pore filling upon coating and curing. In order to diminish pore clogging, the '897 patent requires the coating resin to have a viscosity of at least 35,000 centipoise, preferably 50,000 to 500,000 centipoise. As a consequence, this approach is quite limited in terms of the materials which can be used to coat the surface of the membrane. A resin having a low viscosity will result in the resin pooling into the interiors of the pores during the curing process, thereby causing pore clogging and restricted flow across the membrane. Further, resins having viscosities in the higher range may be inappropriate depending on the application. If the porous polymeric support has too much variation with respect to individual pore diameters, the coating will be unevenly distributed, clogging some pores and insufficiently coating the surfaces of other pores. More importantly, even if the resin viscosity is balanced to maximize membrane coating while minimizing pore blockage, the coating typically will avoid some pore interiors. Thus, only the exterior surface of the membrane will be rendered hydrophilic. Since the porous interior constitutes the vast majority of the surface area of a porous membrane, the hydrophilic modification in the '897 patent leaves a significant amount of the surface area of the membrane (i.e., the pore interiors) hydrophobic.

U.S. Pat. No. 4,618,533 (the '533 patent) describes a porous hydrophobic membrane which is modified with a crosslinked hydrophilic polymer such that the entire surface purportedly is rendered hydrophilic without clogging the pores. The membrane is prepared by soaking a porous hydrophobic polyvinylidene floride (PVDF) membrane in a reagent bath containing a free radical polymerizable monomer (e.g., hydroxypropyl acrylate), a polymerization initiator, and a crosslinking agent (e.g., tetraethyleneglycol diacrylate) such that the reagent bath wets the entire surface of the porous membrane. The polymerization and crosslinking reaction is then carried out using high temperatures (e.g., 95° C.). U.S. Pat. No. 4,917,793 applies the method of the '533 patent toward a polytetrafluoroethylene (PTFE) membrane to produce membranes which are transparent in aqueous media.

U.S. Pat. No. 5,158,721 (the '721 patent) purportedly discloses a hydrophilic membrane formed from an interpenetrating network of a hydrophobic polymer and a hydrophilic crosslinked monomeric composition. The membrane is prepared by casting a thin film of the precursors on a substrate and exposing the film to low intensity UV light to form the interpenetrating polymeric network. The polymeric network is then coagulated to form a porous membrane. The membrane then must be annealed in order to render the surface of the resulting membrane hydrophilic. The annealing causes the hydrophobic polymer to become more crystalline thereby excluding the hydrophilic polymer from the crystalline regions and rendering the membrane surface hydrophilic. Although this approach avoids some of the aforementioned disadvantages of thermal coating, it nevertheless involves heat-treating the membrane at high temperature to induce crystallization of the bulk polymer. Further, the '721 patent teaches that the hydrophobic polymers employed in the disclosed process must be crystalline polymers in order to render the membrane surface hydrophilic after annealing. The requirement of a crystalline bulk polymer is disadvantageous in that it precludes the use of a large number of non-crystalline bulk polymers with excellent properties (e.g., mechanical strength, chemical resistance, and oxidative stability).

Thus, there remains a need for a porous hydrophilic membrane having the desirable bulk properties commonly found in hydrophobic polymers and also having hydrophilic surface properties uniformly distributed throughout the entire surface of the membrane. Further, there is a need for a hydrophilic membrane which is "hydrophilically durable" in that it retains its hydrophilicity under conditions of extended and/or frequent contact with a hydrophilic fluid. Moreover, there is a need for an efficient method to prepare such membranes. The present invention provides such a porous hydrophilic membrane and method of preparing same. These and other objects of the present invention will be apparent from the detailed description of the preferred embodiments of the invention set forth hereinbelow.

BRIEF SUMMARY OF THE INVENTION

The present invention provides a hydrophilic membrane having a pore rating from about 0.02 μm to about 10 μm, which membrane is comprised of a network of a non-crystalline hydrophobic polymer selected from the group consisting of polyethersulfone and polysulfone, and a hydrophilic acrylate polymer derived from a polyalkylene glycol diacrylate, wherein the polyalkylene glycol chain has a molecular weight of at least about 200. Optionally, the hydrophilic acrylate polymer is derived from a polyalkylene glycol diacrylate, wherein the polyalkylene glycol chain has a molecular weight of at least about 200, and a hydrophilic monoacrylate.

The present invention further provides a filtration device comprising a housing and the hydrophilic membrane of the present invention. Also provided is a method of treating a fluid comprising contacting a fluid with the hydrophilic membrane of the present invention.

The present invention further provides a method of preparing a hydrophilic porous membrane wherein a reaction solution comprising a solvent, a non-crystalline hydrophobic polymer selected from the group consisting of polysulfone and polyethersulfone, a hydrophilic polyalkylene glycol diacrylate having a polyalkylene glycol chain of molecular weight at least about 200, a pore-forming agent, and a thermal polymerization initiator is heated to a temperature sufficient to allow the hydrophilic polyalkylene glycol diacrylate to undergo polymerization and/or crosslinking in situ. Thus formed is a casting solution, which is cast to provide the hydrophilic membrane of the present invention. Optionally a hydrophilic monoacrylate also is utilized in the reaction solution.

DETAILED DESCRIPTION OF THE INVENTION

The present invention provides a hydrophilic porous membrane comprising a network of a non-crystalline hydrophobic polymer and a hydrophilic acrylate polymer. The hydrophilic porous membrane of the present invention is preferably a microporous membrane. A person of ordinary skill in the art would appreciate that the minimum pore rating which distinguishes, for example, a microporous membrane from an ultrafiltration membrane is not clearly defined in the art. With regard to the present invention, a porous membrane is considered microporous generally when the pore rating is less than about 10 μm. Preferably, the membrane of the present invention has a pore rating from about 0.02 μm to about 10 μm, more preferably from about 0.02 to about 5 μm, most preferably from about 0.02 μm to less than about 1 μm. For purposes of the present invention, it is assumed that a porous membrane becomes an ultrafiltration membrane, and is no longer "microporous" as described herein, when the pore rating falls below about 0.02 μm.

The non-crystalline hydrophobic polymer can be any suitable polymer, copolymer, blend, mixture, or combination of polymers having suitable bulk properties, provided the polymer, copolymer, blend, mixture, or combination of polymers is not rendered crystalline under the conditions employed in preparing the membrane. Non-crystalline polymers include glassy polymers and polymers which, due to steric factors, insufficient secondary molecular forces in the polymer structure, or inability to pack into a crystalline state, do not have a general tendency to crystallize under moderate crystallization conditions, which exclude extremes of time, temperature, and pressure.

Suitable non-crystalline hydrophobic polymers include polymers such as, for example, polyethersulfones, polysulfones, polyarylsulfides, aryl polyimides, and the like. Preferably, the non-crystalline hydrophobic polymer is a polymer selected from the group consisting of polyethersulfone or a polysulfone.

The non-crystalline hydrophobic polymer can be a blend of polymers wherein one of the components is a semi-crystalline or crystalline polymer such as, for example, ultra high molecular weight polyethylene, polytetrafluoroethylene, and poly(vinylidene fluoride), provided the blend thereof does not result in the crystallinity of the hydrophobic polymer. Preferably, the non-crystalline polymer blend will contain less than 10% by weight of a crystalline polymer component. More preferably, the non-crystalline polymer blend will contain less than 3% by weight of a crystalline polymer component. Most preferably, the non-crystalline polymer is blended with only a trace amount of crystalline polymer component optimally, the non-crystalline polymer component is not blended with any crystalline polymer components whatsoever.

The non-crystalline hydrophobic polymer also can be a non-crystalline copolymer. The copolymer can be a copolymer of at least two non-crystalline polymers or a copolymer of a non-crystalline polymer and a crystalline polymer. Preferably, the copolymer contains less than 10% by weight of a crystalline copolymer unit(s), more preferably less than 3% by weight of a crystalline copolymer unit(s). Most preferably, the copolymer is a copolymer of at least two non-crystalline copolymer units and does not contain any crystalline copolymer unit(s).

In the hydrophilic porous membrane of the present invention, the hydrophilic acrylate polymer and the non-crystalline hydrophobic polymer are integrated in an interpenetrating polymeric network. Unlike a coating or surface treatment, the polymeric network of the present invention possesses significant cross-sectional homogeneity within the membrane with respect to the distribution of the hydrophilic polymer and the non-crystalline hydrophobic polymer. Although not intending to be bound by any particular theory, it is believed that the polymeric network results, in part, from the physical properties of the hydrophilic polymer in combination with the fact that the membrane is prepared from a homogeneous casting solution. It is also believed that membrane properties such as, for example, network homogeneity and surface characteristics, will vary depending on the structure of the hydrophilic polymer.

It will also be appreciated by a person of ordinary skill in the art that the polymeric network will have varying degrees of cross-sectional heterogeneity with respect to the distribution of polymers, since the hydrophilic polymer and the non-crystalline hydrophobic polymer have different affinities with respect to each other. For example, the non-crystalline hydrophobic polymer can have a greater affinity for itself than for molecules of the hydrophilic acrylate polymer, and vice versa. Thus, the polymeric network can possess areas of phase separation such as, for example, heterogeneous regions defined by pockets of the hydrophilic acrylate polymer located within an area of the hydrophobic polymer. In the membrane of the present invention, the structure of the polymeric network must be such that hydrophilic polymer is present on the outer membrane surface and on the surfaces of the pore interiors.

The hydrophilic acrylate polymer of the present invention is a crosslinked acrylate polymer derived from a polyalkylene glycol diacrylate defined by two acrylate groups attached by ester linkages at opposite ends of a hydrophilic polyalkylene glycol chain optionally, the hydrophilic acrylate polymer is a crosslinked polymer derived from a hydrophilic monoacrylate and a polyalkylene glycol diacrylate defined by two acrylate groups attached by ester linkages at opposite ends of a hydrophilic polyalkylene glycol chain. Although not required, it is preferred that the hydrophilic acrylate polymer is derived from the aforesaid polyalkylene glycol diacrylate and a hydrophilic monoacrylate.

A person of ordinary skill in the art will appreciate that polymers derived from diacrylate crosslinking agents, such as the polyalkylene glycol diacrylate of the present invention, are three-dimensional networks that can copolymerize and/or crosslink with one another. The hydrophilic monoacrylate, if present, can polymerize with itself and/or become crosslinked with the polyalkylene glycol diacrylate of the present invention. It will also be appreciated by a person of ordinary skill in the art that methods currently used for characterization in the polymer arts such as, for example, spectroscopic methods, cannot precisely determine the molecular structure of the hydrophilic acrylate polymer network as it exists in the membrane of the present invention. The hydrophilic acrylate polymer of the present invention can have randomness in the structure, regardless of whether the hydrophilic monoacrylate is present, and need not be constructed of similar repeating units.

By way of illustration, one of the possible structural arrangements by which, for example, a polyethylene glycol dimethacrylate can crosslink with itself and/or with 2-hydroxyethyl methacrylate, is represented by the structural fragment below:

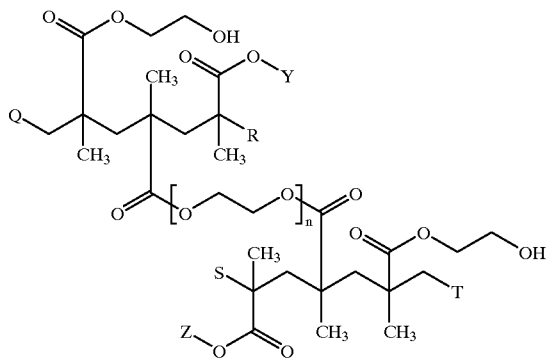

wherein

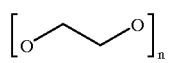

represents a polyethylene glycol chain; Y and Z are the same or different and are each hydroxyethyl or are part of another polyethylene glycol dimethacrylate unit; and Q, R, S, and T are the same or different and are each bonded to the acryloyl residue of a 2-hydroxyethyl methacrylate unit or a polyethylene glycol dimethacrylate unit. The foregoing structural representation is for illustrative purposes only and is intended to represent one of many possible molecular arrangements in which the hydrophilic acrylate polymer of the present invention can be crosslinked and/or copolymerized.

Surprisingly, it has been discovered that membrane hydrophilicity and stability are dramatically improved when the molecular weight of the polyalkylene glycol chain is increased. Not only is the membrane more hydrophilic, but also it is more durable in that it retains hydrophilicity, for example, even after rigorous accelerated challenges with refluxing isopropanol. Desirably, the polyalkylene glycol chain has a molecular weight of at least about 200. Preferably, the molecular weight of the polyalkylene glycol chain is at least about 400, more preferably at least about 600. Any suitable polyalkylene glycol diacrylate can be used in the membrane of the present invention. Suitable polyakylene glycol diacrylates include, for example, polyethylene glycol diacrylates, polyethylene glycol dimethacrylates, polypropylene glycol diacrylates, polypropylene glycol dimethacrylates, poly(1,3-propanediol) diacrylates, poly(1,3-propanediol) dimethacrylates, and the like. In a preferred embodiment the polyalkylene glycol is a polyethylene glycol diacrylate. Suitable polyethylene glycol diacrylates include, for example, polyethylene glycol diacrylates, polyethylene glycol di(alkyl)acrylates, and combinations thereof. Suitable polyethylene glycol di(alkyl)acrylates include compounds such as, for example, polyethylene glycol dimethacrylate, polyethylene glycol diethacrylates, and suitable combinations thereof.

Various species of polyethylene glycol diacrylates can be obtained synthetically or commercially, wherein the average molecular weight of the polyethylene glycol chain comprising the link between the two acrylate groups falls within an average specified range. Commercially, such polyethylene glycol diacrylates are given a "PEG" number which represents the average molecular weight of the polyethylene glycol chain comprising the link between the acrylate moieties. For example, the average molecular weight of the polyethylene glycol chains linking the methacrylate units in polyethylene glycol 200 dimethacrylate is approximately 200. (Thus, the compound is referred to as "PEG 200".) Other ethylene glycol diacrylates of specified PEG, such as polyethylene glycol 400 diacrylate (also called poly (ethylene glycol-400) diacrylate), polyethylene glycol 400 dimethacrylate, and polyethylene glycol 600 dimethacrylate are available commercially from Aldrich Chemical Company, Milwaukee, Wisconsin. Preferably, the polyethylene glycol diacrylate is a polyethylene glycol dimethacrylate of PEG 200 or greater (e.g., of greater than PEG 200 or even PEG 300). More preferably, the polyethylene glycol diacrylate is a polyethylene glycol dimethacrylate of PEG 400 or greater. Most preferably, the polyethelene glycol diacrylate is a polyethelene glycol dimethacrylate of PEG 600 or greater.

A preferred hydrophilic polyalkylene glycol diacrylate of the present invention also can be represented by the formula:

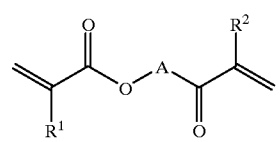

wherein $R^1$ and $R^2$ are the same or different, and are each H, $CH_3$, $CH_2CH_3$, $(CH_2)_2CH_3$, $CH(CH_3)_2$, hydroxyalkyl, arylalkyl, fluoroalkyl, aryl, or heteroaryl; and A is a hydrophilic polyalkylene glycol chain of the formula $(CH_2CHR^3O)_n$ or $(CH_2CH_2CH_2O)_n$, wherein $R^3$ is H or $CH_3$, and n is at least 5. Preferably, $R^1$ and $R^2$ are the same and are each H or $CH_3$, and A is $(CH_2CH_2O)_n$ or $(CH_2CH(CH_3)O)_n$.

Optionally, and preferably, the hydrophilic acrylate polymer is a polymer/copolymer derived from the polyalkylene glycol diacrylate of the present invention and a hydrophilic monoacrylate. Any suitable hydrophilic monoacrylate can be utilized. Suitable hydrophilic monoacrylates include, for example, unsubstituted monoacrylates and substituted monoacrylates such as, for example, methacrylates, and the like. Suitable hydrophilic monoacrylates also include, for example, neutral monoacrylates, monoacrylates with an acidic substituent, monoacrylates with a positively charged substituent, and monoacrylates with a basic substituent. A person of ordinary skill in the art will appreciate that the nature of the substituent on the hydrophilic monoacrylate can have a significant impact on the surface characteristics of the membrane. For example, using a monoacrylate with an acidic substituent imparts cation exchange properties to the resulting membrane, whereas using an acrylate with a positively charged substituent imparts anion exchange properties thereto.

Suitable neutral monoacrylates include, for example, 2-hydroxyethyl acrylate, 2-hydroxyethyl methacrylate, polyethylene glycol monoacrylate, polyethylene glycol monomethacrylate, hydroxypropyl acrylate, hydroxypropyl methacrylate, polypropylene glycol monoacrylate, polypropylene glycol monomethacrylate, 2-methoxyethyl acrylate, 2-phenoxyethyl acrylate, 2-phenoxyethyl methacrylate, and combinations thereof. More generally, the hydroxyalkyl acrylate can be represented by a compound of the formula:

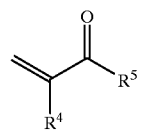

wherein $R^4$ is H, $CH_3$, $CH_2CH_3$, $(CH_2)_2CH_3$, $CH(CH_3)_2$, $C_1$–$C_3$ hydroxyalkyl, $C_1$–$C_3$ arylalkyl, $C_1$–$C_3$ fluoroalkyl, or aryl; and $R^5$ is $(OCH_2CHR^3)_n OH$ or $(OCH_2CH_2CH_2)_n OH$, wherein $R^3$ is H or $CH_3$ and n is an integer from 1 to 15. When $R^5$ is $(OCH_2CH_2)_n OH$, $R^4$ preferably is H or $CH_3$, more preferably $CH_3$. In one preferred embodiment, $R^4$ is $CH_3$ and $R^5$ is $(OCH_2CH_2)_n OH$, wherein n is 1. When $R^4$ is $CH_3$ and $R^5$ is $(OCH_2CH_2)_n OH$, n is more preferably at least 5, and most preferably at least 10. When $R^5$ is $(OCH_2CHR^3)_n OH$, $R^3$ preferably is $CH_3$.

Suitable acidic monoacrylates include, for example, acrylamidocarboxylic acids, acrylamidophosphonic acids, and acrylamidosulfonic acids. Acrylamido organic acids include acrylamidoalkyl organic acids and acrylamidoaryl organic acids. Optionally, the acidic groups can be converted to their corresponding metal and/or ammonium salts. Preferably, the acidic monoacrylate is an acrylamidosulfonic acid, which is desirably a compound of the formula:

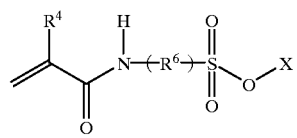

wherein $R^4$ is H, $CH_3$, $CH_2CH_3$, $(CH_2)_2CH_3$, $CH(CH_3)_2$, $C_1$–$C_3$ hydroxyalkyl, $C_1$–$C_3$ arylalkyl, $C_1$–$C_3$ fluroalkyl, or aryl; $R^6$ is a $C_1$–$C_3$ alkyl diradical or an aryl diradical; and X is H, an alkali metal, ammonium, or tetraalkylammonium.

Suitable monoacrylates with a charged amino substituent include (trialkylammonium)alkyl acrylates such as, for example, 2-(dimethylamino)ethyl acrylate, methyl sulfate quaternary ammonium salt, and 2-(dimethylamino)ethyl methacrylate, methyl sulfate quaternary ammonium salt. Preferably, the positively charged hydrophilic monoacrylate is a (trialkylammonium)alkyl acrylate of the formula:

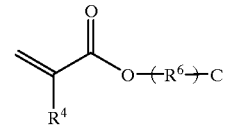

wherein $R^4$ is H, $CH_3$, $CH_2CH_3$, $(CH_2)_2CH_3$, $CH(CH_3)_2$, $C_1$–$C_3$ hydroxyalkyl, $C_1$–$C_3$ arylalkyl, $C_1$–$C_3$ fluroalkyl, or aryl; $R^6$ is a $C_1$–$C_3$ alkyl diradical or an aryl diradical; and C is a trialkylammonium species.

Suitable basic monoacrylates include aminoalkyl acrylates, such as, for example, (dialkylamino)alkyl acrylates. Examples of (dialkylamino)alkyl acrylates include compounds such as 2-(dimethylamino)ethyl acrylate, 2-(dimethylamino)ethyl methacrylate, 2-(diethylamino) ethyl methacrylate. Other examples of (dialkylamino)alkyl acrylates include alkyl acrylates possessing a cyclic amine substituent such as, for example, morpholinoethyl acrylate, morpholinoethyl methacrylate, and the like. Preferably, the basic hydrophilic monoacrylate is a (dialkylamino)alkyl acrylate of the formula:

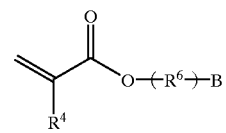

wherein $R^4$ is H, $CH_3$, $CH_2CH_3$, $(CH_2)_2CH_3$, $CH(CH_3)_2$, $C_1$–$C_3$ hydroxyalkyl, $C_1$–$C_3$ arylalkyl, $C_1$–$C_3$ fluroalkyl, or aryl; $R^6$ is a $C_1$–$C_3$ alkyl diradical or an aryl diradical; and B is a dialkylamino substituent of the formula $NR^6R^7$, wherein $R^6$ and $R^7$ are the same or different and are each H, $CH_3$, $CH_2CH_3$, $(CH_2)_2CH_3$, $CH(CH_3)_2$, hydroxyalkyl, arylalkyl, fluroalkyl, or aryl, or is a cyclic amino substituent of the formula:

wherein n is an integer from 4 to 6, and X is O, $NR^4$, S, SO, or $SO_2$.

The porous membrane of the present invention is hydrophilic, which distinguishes it from a hydrophobic membrane possessing some degree of hydrophilicity it will be appreciated by a person of ordinary skill in the art that a hydrophobic membrane possessing a certain degree of hydrophilicity such as, for example, a hydrophilic coating, can still possess hydrophobic characteristics and is not necessarily hydrophilic (i.e., it may nonetheless repel water or may not wet readily in water). In contrast, the membrane of the present invention is completely hydrophilic and will wet instantly in water. Moreover, the membrane of the present invention is so hydrophilic that it will even wet instantly in dilute aqueous sodium chloride. Further, and surprisingly, it has been discovered that the membrane of the present invention has excellent durability. One of the techniques used in the art to predict the service life of a hydrophilic membrane is by measuring the loss of wettability over time when the membrane is subjected to isopropanol Soxhlet extraction. Membrane degradation is typically evidenced by the loss of water wettability. Preferably, the membrane of the present invention retains its water wettability after about 6 hours of Soxhlet extraction with isopropanol at atmospheric pressure (about 100 kPa). More preferably, the membrane of the present invention is wettable in 10% aqueous sodium chloride after about 6 hours of Soxhlet extraction with isopropanol at atmospheric pressure (about 100 kPa). Most preferably, the membrane of the present invention is wettable in 10% aqueous sodium chloride after about 48 hours of Soxhlet extraction with isopropanol at atmospheric pressure (about 100 kPa).

The present invention further provides a filtration device which employs the hydrophilic porous membrane of the present invention. The filtration device can be in any form such as, for example, a cartridge, a plate-frame assembly, a disc, and the like. The filtration device comprises a housing and the hydrophilic porous membrane of the present invention. The membrane can be in any suitable form and, for example, can be utilized as an integral part of a filter element.

The present invention further provides a method of treating a fluid by contacting a fluid with the hydrophilic porous membrane of the present invention. Any suitable fluid can be treated with the membrane of the present invention. Suitable fluids include, for example, aqueous liquids, organic liquids, or combinations thereof. Suitable aqueous liquids include, for example, aqueous suspensions and solutions; biologicals such as, for example, blood, plasma, dialysis fluids, and intravenous fluids; comestibles such as, for example, drinking water, milk, and beer; aqueous effluent materials such as, for example, waste water; and aqueous non-comestibles such as, for example, ink, paint, and dye products. Suitable organic liquids include, for example, organic solvents, and oil-based paints and inks. In a preferred embodiment, the method of treating a fluid of the present invention involves contacting an aqueous fluid with the membrane of the present invention, passing the fluid through the membrane to provide a filtrate, and recovering the filtrate and/or retentate.

The present invention further provides a method of preparing a hydrophilic membrane wherein a reaction solution comprising a solvent, a non-crystalline hydrophobic polymer selected from the group consisting of polysulfone and polyethersulfone, a hydrophilic polyalkylene glycol diacrylate defined by two acrylate groups joined by ester linkages at opposite ends of a hydrophilic polyalkylene glycol chain having a molecular weight of at least about 200, a pore-forming agent, and a thermal polymerization initiator is heated to a temperature sufficient to allow the hydrophilic polyalkylene glycol diacrylate to undergo in situ polymerization and/or crosslinking as described hereinabove. Thus provided is a casting solution which is cast to form a hydrophilic porous membrane comprising a network of a non-crystalline hydrophobic polymer and a hydrophilic acrylate polymer derived from a polyalkylene glycol diacrylate defined by two acrylate groups attached by ester linkages at opposite ends of a hydrophilic polyalkylene glycol chain, said polyalkylene glycol chain having a molecular weight of at least about 200.

The present invention further provides a method of preparing a hydrophilic membrane wherein a reaction solution comprising a solvent, a non-crystalline hydrophobic polymer selected from the group consisting of polysulfone and polyethersulfone, a hydrophilic polyalkylene glycol diacrylate defined by two acrylate groups joined by ester linkages at opposite ends of a hydrophilic polyalkylene glycol chain having a molecular weight of at least about 200, a hydrophilic monoacrylate, a pore-forming agent, and a thermal polymerization initiator is heated to a temperature sufficient to allow the hydrophilic polyalkylene glycol diacrylate and hydrophilic monoacrylate to undergo in situ polymerization and/or crosslinking as described hereinabove. Thus provided is a casting solution which is cast to form a hydrophilic porous membrane comprising a network of a non-crystalline hydrophobic polymer, and a hydrophilic acrylate copolymer derived from a hydrophilic monoacrylate and a polyalkylene glycol diacrylate defined by two acrylate groups attached by ester linkages at opposite ends of a hydrophilic polyalkylene glycol chain, said polyalkylene glycol chain having a molecular weight of at least about 200.

In either of the above methods (i.e., regardless of whether a hydrophilic monoacrylate is used in the reaction solution) any suitable non-crystalline hydrophobic polymer can be used. Suitable non-crystalline polymers include, for example, blends and copolymers as discussed above. Preferably, the non-crystalline hydrophobic polymer is not blended or copolymerized with any crystalline polymer components. Most preferably, the non-crystalline hydrophobic polymer is a polymer selected from the group consisting of polyethersulfone or a polysulfone. Any suitable concentration of the non-crystalline hydrophobic polymer can be used in the reaction solution. Preferably, the non-crystalline hydrophobic polymer is present in the reaction solution in about 5% by weight to about 40% by weight, more preferably from about 10% by weight to about 30% by weight, most preferably from about 10% by weight to about 20% by weight. In a preferred embodiment, the non-crystalline hydrophobic polymer is polyethersulfone, which is present in about 15% by weight of the reaction solution.

Regardless of whether a hydrophilic monoacrylate is used in the reaction solution, any suitable hydrophilic polyalkylene glycol diacrylate can be used in the methods of the present invention. Preferably, the hydrophilic polyalkylene glycol diacrylate is a polyalkylene glycol diacrylate as defined hereinabove. Desirably, the polyalkylene glycol diacrylate is a polyethylene glycol diacrylate of PEG 200 or greater, more preferably a polyethylene glycol dimethacrylate of PEG 200 or greater. Most preferably, the polyethylene glycol dimethacrylate is PEG 400 or greater, or even PEG 600 or greater.

Preferred hydrophilic polyalkylene glycol diacrylates in the method of the present invention also can be represented by the formula:

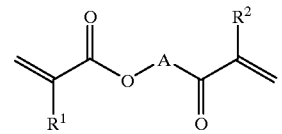

wherein $R^1$ and $R^2$ are the same or different, and are each H, $CH_3$, $CH_2CH_3$, $(CH_2)_2CH_3$, $CH(CH_3)_2$, $C_1$–$C_3$ hydroxyalkyl, $C_1$–$C_3$ arylalkyl, $C_1$–$C_3$ fluoroalkyl, aryl, or heteroaryl; and A is a hydrophilic polyalkylene glycol chain of the formula $(CH_2CHR^3O)_n$ or $(CH_2CH_2CH_2O)_n$, wherein $R^3$ is H or $CH_3$, and n is at least 5. Preferably, $R^1$ and $R^2$ are the same and are each H or $CH_3$, and A is $(CH_2CH_2O)_n$ or $(CH_2CH(CH_3)O)_n$.

Any suitable concentration of the hydrophilic polyalkylene glycol diacrylate can be used in the reaction solution. Preferably, the hydrophilic polyalkylene glycol diacrylate is present in a concentration from about 0.1% by weight to about 5% by weight, more preferably from about 0.2% by weight to about 2% by weight, most preferably from about 0.3% by weight to about 1% by weight. In a preferred embodiment, the hydrophilic polyalkylene glycol diacrylate is present in a concentration of about 0.6% by weight of reaction solution.

Optionally, and preferably, a hydrophilic monoacrylate is used in the method of the present invention. Any suitable hydrophilic monoacrylate can be utilized in the reaction solution. Suitable hydrophilic monoacrylates include, for example, unsubstituted acrylates and substituted acrylates as discussed hereinabove. Suitable hydrophilic monoacrylates also include neutral monoacrylates, monoacrylates with an acidic substituent, monoacrylates with a positively charged substituent, and monoacrylates with a basic substituent, as discussed hereinabove. Suitable neutral monoacrylates include, for example, 2-hydroxyethyl acrylate, 2-hydroxyethyl methacrylate, polyethylene glycol monoacrylate, polyethylene glycol monomethacrylate, hydroxypropyl acrylate, hydroxypropyl methacrylate, polypropylene glycol monoacrylate, polypropylene glycol monomethacrylate, 2-methoxyethyl acrylate, 2-phenoxyethyl acrylate, 2-phenoxyethyl methacrylate, and combinations thereof.

Preferably, the hydrophilic monoacrylate is a compound of the formula:

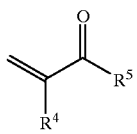

wherein $R^4$ is H, $CH_3$, $CH_2CH_3$, $(CH_2)_2CH_3$, $CH(CH_2)_2$, $C_1$–$C_3$ hydroxyalkyl, $C_1$–$C_3$ arylalkyl, $C_1$–$C_3$ fluoroalkyl, or aryl; and $R^5$ is $(OCH_2CHR^3)_nOH$ or $(OCH_2CH_2CH_2)_nOH$, wherein $R^3$ is H or $CH_3$ and n is an integer from 1 to 15. When $R^5$ is $(OCH_2CH_2)_nOH$, $R^4$ preferably is H or $CH_3$, more preferably $CH_3$. In one preferred embodiment, $R^4$ is $CH_3$ and $R^5$ is $(OCH_2CH_2)_nOH$, wherein n is 1. When $R^4$ is $CH_3$ and $R^5$ is $(OCH_2CH_2)_nOH$, n is more preferably at least 5, and most preferably at least 10. When $R^5$ is $(OCH_2CHR^3)_nOH$, $R^3$ preferably is $CH_3$. The hydrophilic monoacrylate is generally present in the reaction solution at concentrations from about 0.05% to about 5% by weight, preferably from 0.1% to about 2% by weight, more preferably from about 0.1% to about 0.5% by weight.

As will be appreciated by those of ordinary skill in the art, pore-forming agents, cosolvents, viscosity enhancing agents, and nonsolvents can be used as components of the reaction solution of the present inventive method. In either of the above methods, a suitable pore former is used in the reaction solution. In a preferred embodiment, the reaction solution includes polyethylene glycol which is present in concentrations ranging from about 30% to about 85% by weight, preferably from about 40% to about 75% by weight, more preferably from about 55% to about 70% by weight.

Any suitable solvent can be used in the present inventive method of preparing a hydrophilic porous membrane. Suitable solvents include, for example, N-methyl pyrollidone, dimethylacetamide, dimethylformamide, dimethylsulfoxide, and the like. The solvent is generally present in the reaction in ranges from about 1% to about 60% by weight, preferably from about 5% to about 40% by weight, more preferably from about 10% to about 30% by weight. In a preferred embodiment of the present inventive method, the solvent is N-methyl pyrrollidone.

The polymerization initiator can be any suitable initiator which promotes free radical polymerization of the crosslinkable reagents in the reaction solution. Suitable polymerization initiators include thermal initiators and photochemical initiators. Suitable thermal initiators include, for example, 4,4'-azobis( 4-cyanovaleric acid), ammonium persulfate, sodium persulfate, and the like. Suitable photochemical initiators include, for example, benzoin ethers such as isopropyl benzoin ether and butyl benzoin ether and the like; benzophenones such as benzophenone and Michler's ketone; acetophenones such as 2-hydroxy-2-methyl-1-phenylpropane-1-one, , -dimethoxy- - hydroxyacetophenone; and the like. The initiator may be used in any suitable concentration which promotes the propagation of free radicals. Photochemical initiators generally are used in concentrations ranging from about 0.1% to about 10% by weight, preferably from about 1% to about 5% by weight. Thermal initiators generally are used in concentrations ranging from about 0.01% to about 5% by weight, preferably from about 0.05% to about 0.5% by weight. Preferably, the polymerization initiator is a thermal initiator, which is more preferably a persulfate initiator, which is most preferably sodium persulfate or ammonium persulfate.

The conditions which promote in situ polymerization and/or crosslinking of the acrylate monomers include the application of any conventional energy source for initiating free radical polymerization such as heat, ultraviolet light, gamma radiation, electron beam radiation, or the like. The reaction conditions which cause the acrylate monomers to undergo polymerization and/or crosslinking in situ are thermal. Preferably, the crosslinking reaction is carried out thermally, preferably at a temperature from about 18° C. (64° F.) to about 50° C. (122° F.). The temperature is more preferably in the range from about 25° C. (77° F.) to about 40° C. (104° F.), most preferably from about 30° C. (86° F.) to about 40° C. (104° F.).

The casting solution is cast to provide the hydrophilic porous membrane of the present invention. No annealing or crystallization is required to render the membrane surface hydrophilic. Of course, the membrane may be cast using a variety of methods known to those in the art such as, for example, casting in an environmentally controlled chamber or by quenching in a non-solvent. The general technique of casting a resin solution and forming a porous membrane is well-known to those in the art. For example, such a technique is described in U.S. Pat. No. 4,707,266.

The method of the present invention can be applied toward a method of preparing a hydrophilic porous membrane bearing a charged coating, wherein the membrane of the present invention is post-treated with a charged resin. Any suitable resin bearing a positive charge such as, for example, a polyamine resin, can be employed to impart a positive charge. Any suitable resin bearing a negative charge such as, for example, a polystyrene sulfonic acid resin, can be employed to impart a negative charge. The general technique of imparting a charge to a porous membrane is described, for example in U.S. Pat. Nos. 5,282,971, 5,151, 189, and 5,137,633.

The following examples further illustrate the present invention but, of course, should not be construed as in any way limiting its scope.

EXAMPLE 1

This example describes a particular embodiment of the present invention. The membrane provided by the inventive method herein is a hydrophilic porous membrane formed from a network of polyethersulfone and the hydrophilic acrylate polymer derived from the in situ polymerization and crosslinking of polyethylene glycol (400) dimethacrylate.

The components shown in Table 1 were weighed and mixed in a stainless steel blender to provide a mixture having a combined total mass of 300 g. The mixture was stirred for 30 minutes at 32–35° C. (90–95° F.).

TABLE 1

| Components | % by Weight |
|---|---|
| Polyethylene Glycol | 68.1 |
| Polyethersulfone | 13 |
| N-methyl Pyrrolidone (NMP) | 18 |
| Polyethylene Glycol (400) Dimethacrylate (PEG(400)DMA) | 0.8 |
| Ammonium Persulfate | 0.1 |

The resulting mixture was cast in an environmentally controlled casting chamber to provide a porous membrane. The cast membrane was leached with water and oven dried at 85–90° C. for 30 minutes. The dried membrane was hydrophilic. After 3 hours of isopropyl alcohol (IPA) Soxhlet extraction, the hydrophilicity of the membrane remained intact. The surface tension of the membrane was in the range from 75.9–77.7 mN/m (dyne/cm) after the IPA Soxhlet extraction.

EXAMPLE 2

This example describes the preparation of two membranes of the present invention. The membranes provided by the present inventive method herein are hydrophilic porous membranes formed from a network of polyethersulfone and the product derived from the in situ crosslinking of polyethylene glycol (400) dimethacrylate and 2-hydroxyethyl methacrylate.

The membranes were prepared in the same manner as described in Example 1, except that the components used in this example are as shown in Table 2.

TABLE 2

| Components | Formula 2A (% by weight) | Formula 2B (% by weight) |
|---|---|---|
| Polyethylene Glycol | 68.1 | 68.1 |
| Polyethersulfone | 13 | 13 |
| NMP | 18 | 18 |
| PEG(400)DMA | 0.5 | 0.5 |
| 2-Hydroxyethyl Methacrylate (HEMA) | 0.3 | 0.3 |
| Ammonium Persulfate | 0.1 | — |
| Sodium Persulfate | — | 0.1 |

The components of Formula 2A were used in the same manner as set forth in Example 1 to provide a first membrane (Membrane 2A). The same procedure was repeated using the components of Formula 2B to provide a second membrane (Membrane 2B). Both membranes were hydrophilic after drying. After 3 hours of isopropyl alcohol (IPA) Soxhlet extraction, the membranes remained hydrophilic. The surface tensions of both membranes were in the range from 75.9–77.7 mN/m (dyne/cm) after the IPA Soxhlet extraction.

EXAMPLE 3

This example illustrates the enhancement of membrane stability and hydrophilicity of the hydrophilic membrane of the present invention as a result of increasing the PEG value of the polyethylene glycol diacrylate.

Two membranes were prepared, Membrane 3A and Membrane 3B, which differed only in the PEG value of the polyethylene glycol diacrylate crosslinker (polyethylene glycol dimethacrylate), denoted "PEG(Molecular Weight) DMA". The two membranes were then tested for hydrophilicity before and after IPA Soxhlet extraction. The components used in the preparation of these membranes are shown in Table 3.

TABLE 3

| Components | Formula 3A (% by weight) | Formula 3B (% by weight) |
|---|---|---|
| Polyethylene Glycol | 61.9 | 61.9 |
| NMP | 24 | 24 |
| Polyethersulfone | 13 | 13 |
| PEG(400)DMA | 0.7 | — |
| PEG(200)DMA | — | 0.7 |
| HEMA | 0.3 | 0.3 |
| Ammonium Persulfate | 0.1 | 0.1 |

The components of Formula 3A were weighed and mixed in a stainless steel blender at 35–46° C. (95–115° F.). A membrane was prepared by casting the resulting mixture on a substrate in an environmentally controlled gelation chamber. The resulting membrane was then leached in a water bath and dried in a conventional oven to provide Membrane 3A, which has a PEG 400 polyethylene glycol dimethacrylate crosslinker. The identical procedure was repeated using the components of Formula 3B to provide Membrane 3B, which has a PEG 200 polyethylene glycol dimethacrylate crosslinker. The hydrophilic properties of the two membranes are shown in Table 4. The water flow rate of each of the membranes was determined at a pressure of 68.9 kPa (10 psi). The "wet in" (wettability) of the dried membrane was determined before and after 3 hours of IPA Soxhlet extraction, as represented by the maximum percentage of aqueous NaCl (by weight) which wetted the membrane.

TABLE 4

| | Membrane 3A (PEG 400) | Membrane 3B (PEG 200) |
|---|---|---|
| Water Bubble Point (kPa) [psi] | 289.4 [42.0] | 304.5 [44.2] |
| Water Flow Rate (ml/min/cm$^2$) | 48.6 | 45.3 |
| Thickness ($\mu$m) [mils] | 109 [4.3] | 107 [4.2] |
| Wet in (before Soxhlet extraction) | 15% NaCl (by weight) | 10% NaCl (by weight) |
| Wet in (after Soxhlet extraction) | 15% NaCl (by weight) | 5% NaCl (by weight) |

The results in Table 4 clearly demonstrate that Membrane 3A is more hydrophilic than Membrane 3B before IPA Soxhlet extraction (Membrane 3A is wettable in 15% NaCl versus 10% NaCl for Membrane 3B). These data further demonstrate that Membrane 3A is more stable than Membrane 3B (Membrane 3A retains 100% of its hydrophilicity, reflected by wettability, after 3 hours of IPA Soxhlet extraction at atmospheric pressure (about 100 kPa), whereas the hydrophilicity of Membrane 3B is reduced significantly after 3 hours of IPA Soxhlet extraction).

EXAMPLE 4

This example illustrates the effect on membrane membrane hydrophilicity and durability as the average molecular weight of the polyethylene glycol chain of polyethylene glycol dimethacrylate increases from zero (i.e., no diacrylate crosslinker at all) to 600.

Six membranes were prepared, Membranes 4A–4F, from the corresponding Formulae 4A–4F, respectively, the components of which are shown in Table 5.

TABLE 5

| Components | Formula 4A (% by wt.) | Formula 4B (% by wt.) | Formula 4C (% by wt.) | Formula 4D (% by wt.) | Formula 4E (% by wt.) | Formula 4F (% by wt.) |
|---|---|---|---|---|---|---|
| Polyethylene Glycol | 54.1 | 54.1 | 54.1 | 54.1 | 54.1 | 54.1 |
| Polyethersulfone | 15 | 15 | 15 | 15 | 15 | 15 |
| NMP | 30 | 30 | 30 | 30 | 30 | 30 |
| HEMA | 0.8 | 0.2 | 0.2 | 0.2 | 0.2 | — |
| Polyethylene glycol monomethacrylate (PEG 360) | — | — | — | — | — | 0.2 |
| EGDMA ("PEG 44") (ethylene-glycol dimethacrylate) | 0.6 | 0.6 | — | — | — | — |
| PEG (200) DMA | — | — | 0.6 | — | — | — |
| PEG (400) DMA | — | — | — | 0.6 | — | 0.6 |
| PEG (600) DMA | — | — | — | — | 0.6 | — |
| Ammonium Persulfate | 0.1 | 0.1 | 0.1 | 0.1 | 0.1 | 0.1 |

Identical procedures were used for each of the formulations as follows. The components for each of Formulas 4A–4F were mixed in a stainless steel blender and agitated for 6 hours. The temperature of the reaction solution was maintained at 38° C.±5° C. (100° F.±10° F.) by controlling the speed of the agitation. The resulting casting solutions were degassed for 4 hours under vacuum, and cast into a gel chamber to provide membrane samples in sheet form. The resulting membrane samples were washed with cold water (5 min.), followed by ethanol (15 min.), then with hot water (60° C.) to remove residual reactants, solvents and/or pore formers. The washed membranes were then transferred to an oven and dried for 2 hours at 80° C.

The dried membranes were cut into 47 mm discs, and half of them were directly tested for wettability in water and aqueous sodium chloride (approximate surface tension of test solution indicated in parenthesis). The other half of the membranes were transferred to a Soxhlet extractor and subjected to extraction with isopropanol (IPA) for 6 hours at atmospheric pressure (about 100 kpa). The IPA-extracted membranes were washed with water to remove the residual IPA, transferred to an oven, and dried for 2 hours at 80° C. The dried IPA-extracted membranes were tested for wettability. The wettability of the membranes before and after Soxhlet extraction are shown in Table 6. In Table 6, the membranes which were not subjected to IPA Soxhlet extraction are denoted "before", whereas the IPA-extracted membranes are denoted "after". Membranes which were instantly wettable in the indicated test solution are indicated by "W", whereas membranes which wet slowly or did not wet at all in the indicated test solution are indicated "N".

TABLE 6

| Aqueous NaCl (% by wt.) [Surface Energy] (mN/m) (dyne/cm) | 0% [72] (water) | 5% [74] | 10% [76] | 15% [77.5] | 20% [79.5] | 25% [82] |
|---|---|---|---|---|---|---|
| Membrane 4A (no diacrylate) | | | | | | |
| before | W | N | N | N | N | N |
| after | N | N | N | N | N | N |
| Membrane 4B ("PEG 44") | | | | | | |
| before | W | W | N | N | N | N |
| after | W | N | N | N | N | N |
| Membrane 4C (PEG 200) | | | | | | |
| before | W | W | W | W | N | N |
| after | W | W | N | N | N | N |
| Membrane 4D (PEG 400) | | | | | | |
| before | W | W | W | W | N | N |
| after | W | W | W | N | N | N |
| Membrane 4E (PEG 600) | | | | | | |
| before | W | W | W | W | N | N |
| after | W | W | W | N | N | N |
| Membrane 4F (PEG 400) | | | | | | |
| before | W | W | W | W | W | W |
| after | W | W | W | W | W | N |

The results in Table 6 clearly demonstrate the significant improvement in membrane properties using a higher molecular weight polyethylene glycol chain in the diacrylate crosslinker, both as to the extent of hydrophilicity and the durability of that hydrophilicity. Membrane 4A (no diacrylate) had poor hydrophilicity before extraction and became hydrophobic after extraction. Membrane 4B ("PEG 44", technically not a "poly"-ethylene glycol inasmuch as only one ethylene glycol unit (MW 44) links the two methacrylate groups together) was more hydrophilic but lost its wettability in 5% aq. NaCl after Soxhlet extraction. Membrane 4C (PEG 200) was even more hydrophilic and retained its wettability in 5% aq. NaCl after Soxhlet extraction.

Membranes 4D and 4E (PEG 400 and PEG 600, respectively) had excellent hydrophilicity and retained their ability to instantaneously wet in 10% aq. NaCl after Soxhlet extraction. Membrane 4F, in which the hydrophilic monomer is a polyethylene glycol monomethacrylate, was the most hydrophilic, and was wettable in 20% aq. NaCl after Soxhlet extraction, demonstrating that the hydrophilic membrane and preparation method of the present invention can be readily applied toward a variety of hydrophilic monoacrylate species.

The stability of the membrane of the present invention was further confirmed by prolonged Soxhlet extraction challenges. Alternate samples of Membranes 4D and 4E (PEG 400 and PEG 600, respectively) prepared in the present example were subjected to IPA Soxhlet extraction for 48 hours at atmospheric pressure (about 100 kPa) and dried as above, but nonetheless retained their ability to wet instantly in 10% aq. NaCl. Membrane 4F is predicted to perform at least as well as Membranes 4D and 4E after being subjected to a prolonged Soxhlet extraction challenge.

All of the references, including patents and present application, cited herein are hereby incorporated in their entireties by reference.

While particular embodiments of the invention have been shown, it will of course be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. A hydrophilic membrane having a pore rating from about 0.02 µm to about 10 µm, said membrane comprising a network of a non-crystalline hydrophobic polymer selected from the group consisting of polyethersulfone and polysulfone, and a hydrophilic acrylate polymer derived from a polyalkylene glycol diacrylate defined by two acrylate groups attached by ester linkages at opposite ends of a hydrophilic polyalkylene glycol chain having a molecular weight of at least about 200 and, optionally, a hydrophilic monoacrylate.

2. The hydrophillic membrane of claim 1, wherein said hydrophilic acrylate polymer is derived from said polyalkylene glycol diacrylate alone.

3. The hydrophilic membrane of claim 1, wherein said hydrophilic acrylate polymer is a hydrophilic acrylate copolymer derived from a polyalkylene glycol diacrylate, defined by two acrylate groups attached by ester linkages at opposite ends of a hydrophilic polyalkylene glycol chain having a molecular weight of at least about 200, and a hydrophilic monoacrylate.

4. The hydrophilic membrane of claim 3, wherein said hydrophilic monoacrylate is a compound of the formula:

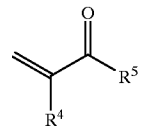

wherein $R^4$ is H, $CH_3$, $CH_2CH_3$, $(CH_2)_2CH_3$, $CH(CH_3)_2$, $C_1$–$C_3$ hydroxyalkyl, $C_1$–$C_3$ arylalkyl, $C_1$–$C_3$ fluoroalkyl, or aryl; and $R^5$ is $(OCH_2CHR^3)_nOH$ or $(OCH_2CH_2CH_2)_nOH$, wherein $R^3$ is H or $CH_3$ and n is an integer from 1 to 15.

5. The hydrophilic membrane of claim 4, wherein $R^4$ is $CH_3$ and $R^5$ is $(OCH_2CH_2)_nOH$.

6. The hydrophilic membrane of claim 5, wherein n is 1.

7. The hydrophilic membrane of claim 5, wherein n is at least 5.

8. The hydrophilic membrane of claim 5, wherein n is at least 10.

9. The hydrophilic membrane of claim 4, wherein $R^3$ is $CH_3$.

10. The hydrophilic membrane of claim 3, wherein said hydrophilic monoacrylate is selected from the group consisting of 2-hydroxyethyl acrylate, 2-hydroxyethyl methacrylate, polyethylene glycol monoacrylate, polyethylene glycol monomethacrylate, hydroxypropyl acrylate, hydroxypropyl methacrylate, polypropylene glycol monoacrylate, polypropylene glycol monomethacrylate, 2-methoxyethyl acrylate, 2-phenoxyethyl acrylate, 2-phenoxyethyl methacrylate, and combinations thereof.

11. The hydrophilic membrane of claim 3, wherein said hydrophilic monoacrylate is an acrylamidosulfonic acid.

12. The hydrophilic membrane of claim 3, wherein said hydrophilic monoacrylate is a (trialkylammonium)alkyl acrylate.

13. The hydrophilic membrane of claim 3, wherein said hydrophilic monoacrylate is a (dialkylamino)alkyl acrylate.

14. The hydrophilic membrane of claim 1, wherein said hydrophilic polyalkylene glycol diacrylate comprises a polyethylene glycol dimethacrylate of PEG 200 or greater.

15. The hydrophilic membrane of claim 14, wherein said hydrophilic polyalkylene glycol diacrylate comprises a polyethylene glycol dimethacrylate of PEG 400 or greater.

16. The hydrophilic membrane of claim 15, wherein said hydrophilic polyalkylene glycol diacrylate comprises a polyethylene glycol dimethacrylate of PEG 600 or greater.

17. The hydrophilic membrane of claim 1, wherein said hydrophilic polyalkylene glycol diacrylate comprises a compound of the formula:

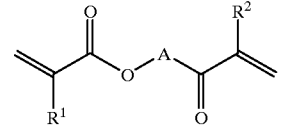

wherein $R^1$ and $R^2$ are the same or different, and are each H, $CH_3$, $CH_2CH_3$, $(CH_2)_2CH_3$, or $CH(CH_3)_2$; and A is a hydrophilic polyalkylene glycol chain of the formula $(CH_2CHR_3O)_n$ or $(CH_2CH_2CH_2O)_n$, wherein $R_3$ is H or $CH_3$, and n is at least 5.

18. The hydrophilic membrane of claim 17, wherein $R^1$ and $R^2$ are the same and are each H or $CH_3$, and A is $(CH_2CH_2O)_n$ or $(CH_2CH(CH_3)O)_n$.

19. The hydrophilic membrane of claim 1, wherein said hydrophilic polyalkylene glycol diacrylate is selected from the group consisting of polyethylene glycol diacrylate, polyethylene glycol dimethacrylate, polypropylene glycol diacrylate, polypropylene glycol dimethacrylate, and combinations thereof.

20. The hydrophilic membrane of claim 1, which wets in 10% aqueous sodium chloride after extraction with refluxing isopropanol for about 6 hours at about 100 kPa.

21. The hydrophilic membrane of claim 1, which wets in 10% aqueous sodium chloride after extraction with refluxing isopropanol for about 48 hours at about 100 kPa.

22. A filtration device comprising a housing and the hydrophilic membrane of claim 1.

23. A method of treating a fluid comprising contacting a fluid with the hydrophilic membrane of claim 1.

24. A method of preparing the hydrophilic membrane of claim 1 comprising:
   (a) providing a reaction solution comprising a solvent, a non-crystalline hydrophobic polymer selected from the group consisting of polysulfone and polyethersulfone, a hydrophilic polyalkylene glycol diacrylate defined by two acrylate groups attached by ester linkages at opposite ends of a hydrophilic polyalkylene glycol chain having a molecular weight of at least about 200, a pore-forming agent, a thermal polymerization initiator, and, optionally, a hydrophilic monoacrylate,
   (b) heating said reaction solution to a temperature sufficient to allow said hydrophilic polyalkylene glycol diacrylate and, if present, said hydrophilic monoacrylate to undergo polymerization and/or crosslinking in situ to provide a casting solution, and
   (c) casting said casting solution to provide said hydrophilic membrane.

25. The method of claim 24, wherein said hydrophilic monoacrylate is not present.

26. The method of claim 24, wherein said hydrophilic monoacrylate is present.

27. The method of claim 26, wherein said hydrophilic monoacrylate is a a compound of the formula:

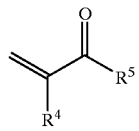

wherein $R^4$ is H, $CH_3$, $CH_2CH_3$, $(CH_2)_2CH_3$, $CH(CH_3)_2$, $C_1$–$C_3$ hydroxyalkyl, $C_1$–$C_3$ arylalkyl, $C_1$–$C_3$ fluoroalkyl, or aryl; and $R^5$ is $(OCH_2CHR^3)_nOH$ or $(OCH_2CH_2CH_2)_nOH$, wherein $R^3$ is H or $CH_3$ and n is an integer from 1 to 15.

28. The method of claim 27, wherein $R^4$ is $CH_3$ and $R^5$ is $(OCH_2CH_2)_nOH$.

29. The method of claim 28, wherein n is 1.

30. The method of claim 28, wherein n is at least 5.

31. The method of claim 27, wherein $R^3$ is $CH_3$.

32. The method of claim 26, wherein said hydrophilic monoacrylate is selected from the group consisting of 2-hydroxyethyl acrylate, 2-hydroxyethyl methacrylate, polyethylene glycol monoacrylate, polyethylene glycol monomethacrylate, hydroxypropyl acrylate, hydroxypropyl methacrylate, polypropylene glycol monoacrylate, polypropylene glycol monomethacrylate, 2-methoxyethyl acrylate, 2-phenoxyethyl acrylate, 2-phenoxyethyl methacrylate, and combinations thereof.

33. The method of claim 24, wherein said hydrophilic polyalkylene glycol diacrylate comprises a polyethylene glycol dimethacrylate of PEG 200 or greater.

34. The method of claim 33, wherein said hydrophilic polyalkylene glycol diacrylate comprises a polyethylene glycol dimethacrylate of PEG 400 or greater.

35. The method of claim 34, wherein said hydrophilic polyalkylene glycol diacrylate comprises a polyethylene glycol dimethacrylate of PEG 600 or greater.

36. The method of claim 24, wherein said hydrophilic polyalkylene glycol diacrylate comprises a compound of the formula:

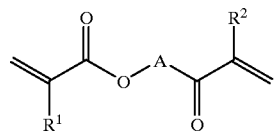

wherein $R^1$ and $R^2$ are the same or different, and are each H, $CH_3$, $CH_2CH_3$, $(CH_2)_2CH_3$, or $CH(CH_3)_2$; and A is a hydrophilic polyalkylene glycol chain of the formula $(CH_2CHR^3O)_n$ or $(CH_2CH_2CH_2O)_n$, wherein $R^3$ is H or $CH_3$, and n is at least 5.

37. The method of claim 36, wherein $R^1$ and $R^2$ are the same and are each H or $CH_3$, and A is $(CH_2CH_2O)_n$ or $(CH_2CH(CH_3)O)_n$.

38. The method of claim 24, wherein said hydrophilic polyalkylene glycol diacrylate is selected from the group consisting of polyethylene glycol diacrylate, polyethylene glycol dimethacrylate, polypropylene glycol diacrylate, polypropylene glycol dimethacrylate, and combinations thereof.

39. The method of claim 24, wherein said thermal polymerization initiator is selected from the group consisting of sodium persulfate and ammonium persulfate.

40. The method of claim 24, wherein said temperature is from about 27° C. to about 50° C.

* * * * *